United States Patent
Taira et al.

(10) Patent No.: US 6,569,216 B1
(45) Date of Patent: May 27, 2003

(54) ABRASIVE FLUID COMPOSITIONS

(75) Inventors: Koji Taira, Wakayama (JP); Shigeo Fujii, Wakayama (JP); Yoshiaki Oshima, Wakayama (JP); Koichi Naito, Tokyo (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 09/856,713

(22) PCT Filed: Nov. 26, 1999

(86) PCT No.: PCT/JP99/06592

§ 371 (c)(1),
(2), (4) Date: May 25, 2001

(87) PCT Pub. No.: WO00/32712

PCT Pub. Date: Jun. 8, 2000

(30) Foreign Application Priority Data

| Nov. 27, 1998 | (JP) | 10-336416 |
| Jul. 22, 1999 | (JP) | 11-207473 |

(51) Int. Cl.$^7$ .................. C09G 1/02; C09G 1/04; C09K 3/14
(52) U.S. Cl. .................. 51/309; 51/307; 51/308; 106/3; 216/89; 438/692; 438/693; 451/36
(58) Field of Search ............... 51/307, 308, 309; 106/3; 438/692, 693; 216/89; 252/79.1; 451/36

(56) References Cited

U.S. PATENT DOCUMENTS

| 4,031,031 A | * | 6/1977 | Yamaguchi et al. | 134/25.5 |
| 4,395,365 A | * | 7/1983 | Hasegawa et al. | 510/254 |
| 4,956,015 A | * | 9/1990 | Okajima et al. | 106/3 |
| 5,266,088 A | * | 11/1993 | Sandusky et al. | 106/8 |
| 5,366,542 A | | 11/1994 | Yamada et al. | |
| 5,626,640 A | | 5/1997 | Ishitobi | |
| 6,099,604 A | * | 8/2000 | Sandhu et al. | 106/3 |

FOREIGN PATENT DOCUMENTS

| JP | A59018782 | 1/1984 |
| JP | A4363385 | 12/1992 |
| JP | A8287456 | 11/1996 |
| JP | A10214420 | 8/1998 |

* cited by examiner

*Primary Examiner*—Michael Marcheschi
(74) *Attorney, Agent, or Firm*—Birch, Stewart, Kolasch & Birch, LLP

(57) ABSTRACT

A polishing composition comprising a chelating compound or a salt thereof; a partially esterified product and/or partially etherified product of a polyhydric alcohol compound; and water; a polishing composition comprising water, an abrasive, an intermediate alumina, and a chelating compound or a salt thereof, wherein the content of the intermediate alumina is from 1 to 50 parts by weight, based on 100 parts by weight of the abrasive; and a polishing composition comprising water, an abrasive, an intermediate alumina, a chelating compound or a salt thereof, and a partially esterified product and/or partially etherified product of a polyhydric alcohol compound, wherein the content of the intermediate alumina is from 1 to 50 parts by weight, based on 100 parts by weight of the abrasive. By using the polishing composition, the polishing rate can be increased, and the surface roughness can be lowered, without causing defects such as scratches and pits on the surface of an object to be polished.

18 Claims, No Drawings

ABRASIVE FLUID COMPOSITIONS

This application is the national phase under 35 U.S.C. §371 of PCT International Application No. PCT/JP99/06592 which has an International filing date of Nov. 26, 1999, which designated the United States of America.

TECHNICAL FIELD

The present invention relates to a polishing composition and a polishing process.

BACKGROUND ART

With advancement of densification of hard disks, an increase in the polishing rate and improvement in reduction in the surface roughness have been demanded in a polishing process for a hard disk substrate. Also, even in the field of semiconductors, the finely sizing of a design room for a semiconductor has been progressed with the advancements in high integration and high speeds, so that a focal depth becomes shallow during the process for manufacturing the device, whereby further demanding planarization of the pattern-forming surface. Therefore, studies have been made on a polishing composition using a chelating compound or a salt thereof, and a polishing process (Japanese Examined Publication No. Hei 7-81132).

However, when only the chelating compound or a salt thereof is used, effects for high planarization of pattern-forming surfaces of hard disk substrates and semiconductors and for reduction in the surface roughness and surface defects such as scratches and pits are insufficient, and the surface defects are increased depending on objects to be polished. Therefore, the composition cannot be said to be satisfactory as a polishing composition.

In addition, a polishing composition using water, alumina, boehmite, and a chelating compound, and a polishing process have been studied (Japanese Patent Laid-Open No. Hei 11-92749). However, this polishing composition has some but insufficient effects for increasing the polishing rate and for reducing surface defects such as scratches and pits. Therefore, its effects cannot also be said to be satisfactory for reduction in the surface roughness and for the planarization.

DISCLOSURE OF INVENTION

An object of the present invention is to provide a polishing composition capable of increasing the polishing rate and reducing the surface roughness, without causing surface defects on a surface of an object to be polished; and a polishing process for a substrate to be polished.

These objects and other objects of the present invention will be apparent from the following description.

Specifically, in sum, the present invention relates to:

[1] a polishing composition comprising a chelating compound or a salt thereof; a partially esterified product and/or partially etherified product of a polyhydric alcohol compound; and water [hereinafter referred to as "a first polishing composition"];

[2] the polishing composition according to item [1] above, further comprising an abrasive [hereinafter referred to as "a second polishing composition"];

[3] a polishing composition comprising water, an abrasive, an intermediate alumina, and a chelating compound or a salt thereof, wherein the content of the intermediate alumina is from 1 to 50 parts by weight, based on 100 parts by weight of the abrasive [hereinafter referred to as "a third polishing composition"];

[4] a polishing composition comprising water, an abrasive, an intermediate alumina, a chelating compound or a salt thereof, and a partially esterified product and/or partially etherified product of a polyhydric alcohol compound, wherein the content of the intermediate alumina is from 1 to 50 parts by weight, based on 100 parts by weight of the abrasive [hereinafter referred to as "a fourth polishing composition"]; and

[5] a polishing process for a substrate to be polished, comprising polishing the substrate to be polished by using a polishing composition as defined in any one of items [1] to [4] above during polishing.

BEST MODE FOR CARRYING OUT THE INVENTION

The polishing composition of the present invention includes:

[Embodiment A] a polishing composition comprising a chelating compound or a salt thereof; a partially esterified product and/or partially etherified product of a polyhydric alcohol compound; and water; and further comprising an abrasive as occasion demands (the first and second polishing compositions);

[Embodiment B] a polishing composition comprising water, an abrasive, an intermediate alumina, and a chelating compound or a salt thereof, characterized in that the content of the intermediate alumina is from 1 to 50 parts by weight, based on 100 parts by weight of the abrasive (the third polishing composition); and

[Embodiment C] a polishing composition comprising water, an abrasive, an intermediate alumina, a chelating compound or a salt thereof, a partially esterified product and/or partially etherified product of a polyhydric alcohol compound, characterized in that the content of the intermediate alumina is from 1 to 50 parts by weight, based on 100 parts by weight of the abrasive (the fourth polishing composition).

Next, each of the embodiments will be described.

[Embodiment A]

The chelating compound usable in this embodiment is a compound having a multidentate ligand, capable of forming a complex by binding with a metal ion. The chelating compound includes, for instance, hydroxycarboxylic acids such as tartaric acid and malic acid; aminocarboxylic acids such as nitrilotriacetic acid, ethylenediaminetetraacetic acid, and diethylenetriaminepentaacetic acid; polymer compounds obtained from introducing these aminocarboxylic acids; (meth)acrylic acid polymers; copolymers of (meth) acrylic acid with other monomers; and the like. Among the chelating compounds, those having two or more carboxyl groups are preferable, from the viewpoint of increasing the polishing rate, and those aminocarboxylic acids further having amino group are more preferable, and those polyaminocarboxylic acids further having two or more amino groups are especially preferable.

The salt of these chelating compounds is not particularly limited, as long as it is a salt with a substance capable of forming a salt with the chelating compound. Concretely, there are included salts with metals, ammonium, alkylammoniums, organic amines, and the like. Concrete examples of the metals include metals belonging to the Groups 1A, 1B, 2A, 2B, 3A, 3B, 4A, 6A, 7A and 8 of the Periodic Table (long period form). Among these metals, those belonging to the Groups 1A, 3A, 3B, 7A and 8 are preferable, from the viewpoint of increasing the polishing rate, and those belonging to the Groups 1A, 3A, 3B, 7A and 8 are more preferable. Cerium belonging to the Group 3A, aluminum belonging to the Group 3B, manganese belonging to the Group 7A, and iron and cobalt belonging to the Group 8 are especially preferable, and aluminum belonging to the Group 3B, and iron and cobalt belonging to the Group 8 are most preferable. As to the salt of these chelating compounds, a salt with a required metal may be previously formed, or a desired salt may be obtained by mixing an inorganic acid salt such as nitrate, sulfate or phosphate, or an organic acid salt such as acetate containing these metals with a chelating compound to carry out chelation exchange in the polishing composition.

Concrete examples of the alkylammoniums include dimethylammonium, trimethylammonium, tetramethylammonium, tetraethylammonium, tetrabutylammonium, and the like.

Concrete examples of the organic amines include alkanolamines, and the like.

The salt of the chelating compound is especially preferably salts formed between polyaminocarboxylic acids and cerium belonging to the Group 3A, aluminum belonging to the Group 3B, manganese belonging to the Group 7A, or iron and cobalt belonging to the Group 8, from the viewpoint of increasing the polishing rate. Salts formed between polyaminocarboxylic acids and aluminum belonging to the Group 3B, or iron and cobalt belonging to the Group 8 are most preferable. Also, the salt may be salts with two or more kinds of substances capable of forming a salt with the chelating compound. Especially, the salt of aluminum and other substances is especially preferable.

These chelating compounds or salts thereof may be used alone, or in admixture of two or more kinds.

The content of the chelating compound or a salt thereof in the first polishing composition is preferably from 0.05 to 20% by weight, more preferably from 0.1 to 15% by weight, still more preferably from 0. 5 to 10% by weight, from the viewpoint of increasing the polishing rate.

The polyhydric alcohol compound includes cyclic polyhydric alcohol compounds and chain polyhydric alcohol compounds. The cyclic polyhydric alcohol compounds include polyhydric alcohols having pyranose skeleton and/or furanose skeleton; polyhydric alcohol compounds in which a cyclic polyhydric alcohol has a functional group other than hydroxyl group; and alkylene oxide adducts of these compounds. Concrete examples thereof include D-ribose, D-arabinose, D-xylose, D-lyxose, D-allose, D-altrose, D-glucose, D-mannose, D-gulose, D-idose, D-galactose, D-talose, D-fructose, D-erythrose, D-threose, trehalose, maltose, cellobiose, gentiobiose, lactose, raffinose, gentianose, melezitose, maltotriose, cellotriose, mannotriose, starch, cellulose, mannan, sucrose, stachyose, inulin, D-glucuronic acid, D-galacturonic acid, D-mannuronic acid, L-iduronic acid, L-glucuronic acid, D-glucosamine, D-galactosamine, pectic acid, alginic acid, chitosan, and the like.

The chain polyhydric alcohol compounds include chain polyhydric alcohols; chain polyhydric alcohol compounds in which a chain polyhydric alcohol has a functional group other than hydroxyl group; and alkylene oxide adducts of these compounds. Concrete examples thereof include glycerol, erythritol, ribitol, p-arabinitol, xylitol, allitol, sorbitol, mannitol, p-iditol, galactitol, D-talitol, trimethylolpropane, trimethylolethane, 1,2,4-butanetriol, 1,2,6-hexanetriol, 1,1,1-hexanetriol, ditrimethylolpropane, pentaeryiritol, dipentaerythritol, polyvinyl alcohols, diglycerol, polyglycerols, gluconic acid, and the like; alkylene oxide adducts of these compounds; and the like.

The molecular weight of the polyhydric alcohol compound is from 100 to 10000, preferably from 200 to 8000, more preferably from 300 to 5000, from the viewpoints of improvement in the solubility to water and improvement in dischargeability of the polishing powder. There are some polyhydric alcohol compounds having a molecular weight of several hundred thousands depending upon their kinds. These polyhydric alcohol compounds may be subjected to a treatment such as hydrolysis to give a polyhydric alcohol compound having a desired molecular weight, and thereafter used as a derivative, from the viewpoint of the water solubility and the viscosity.

It is preferable that the number of carbon atoms of the alkylene oxide of the alkylene oxide adduct of the polyhydric alcohol compound is from 2 to 4, from the viewpoint of improving the water solubility of the polyhydric alcohol compound. The preferred alkylene oxide includes ethylene oxide, propylene oxide, butylene oxide, and the like. These alkylene oxides can be used alone or in combination. Among them, ethylene oxide is especially preferable. In a case where two or more kinds of alkylene oxides are used, the alkylene oxides may be subjected to random addition or block addition. The number of moles of the alkylene oxide in the polyhydric alcohol compound is determined in consideration of the solubility in water and thickening ability of the added compound. The number of moles of the alkylene oxide is preferably 50 mol or less, more preferably 30 mol or less, per one hydroxyl group of the polyhydric alcohol compound.

The partially esterified product and/or partially etherified product of a polyhydric alcohol compound (hereinafter referred to as "derivative of the polyhydric alcohol compound") can be obtained by ordinary esterification reaction or etherification reaction. For instance, the partially esterified product is obtained by reacting hydroxyl group or hydroxyl groups of the polyhydric alcohol compound with a carboxylic acid. In the case of a polyhydric alcohol compound having a carboxyl group, the carboxyl moiety may be esterified with an alcoholate or the like. In addition, the partially etherified product is obtained by treating hydroxyl group or hydroxyl groups of the polyhydric alcohol compound with an alkali metal or the like to convert the polyhydric alcohol compound to an alkoxide, and reacting the alkoxide with an alkyl halide or the like.

The number of carbon atoms of partially esterified or partially etherified acyl group or partially esterified or partially etherified hydrocarbon group is preferably from 1 to 24, more preferably from 2 to 22, still more preferably from 3 to 20, most preferably from 4 to 20, from the viewpoints of the solubility in water and the thickening ability during dissolution, and from the viewpoint of reduction in the surface roughness of the polished surface. These acyl groups or hydrocarbon groups may be aliphatic groups or aromatic groups. In addition, those compounds may have two or more acyl groups in one molecule, or two or more hydrocarbon groups, or simultaneously have one or more acyl groups and one or more hydrocarbon groups. The aliphatic groups are especially preferable, from the viewpoint of reducing the surface roughness of the polished surface. The aliphatic groups may be any of saturated or unsaturated groups, and any of linear or branched groups.

The derivative of the polyhydric alcohol compound may be used alone or in combination of two or more kinds.

It is desired that the esterification ratio or etherification ratio of the derivative of the polyhydric alcohol compound is such that the polyhydric alcohol compound is esterified or etherified at from 3 to 95%, preferably from 5 to 70%, still more preferably from 10 to 50%, from the viewpoints of the improvement in the solubility in water, and the reduction in the surface roughness and in the surface defects. Here, the esterification ratio or etherification ratio refers to an average esterified or etherified ratio on the basis of the total number of the entire hydroxyl groups and the entire carboxyl groups of the polyhydric alcohol compound (average, in the case where the esterified or etherified ratios respectively have distributions depending upon the compounds).

Among the derivatives of the polyhydric alcohol compound, derivatives of the cyclic polyhydric alcohol compound are preferable, from the viewpoint of the reduction in the surface roughness, and partially esterified products of sucrose are especially preferable.

The synergistic effects by combination of the chelating compound or a salt thereof with the derivative of the polyhydric alcohol compound are presumably such that the chelating compound acts on an abrasive, a polishing powder, a substrate to be polished or the like to some extent to improve the dispersibility or to improve the dischargeability of the polishing waste liquor, or the like, thereby increasing the polishing rate. However, the chelating compound or a salt thereof alone is insufficient for suppressing the surface defects, the main causation of which is thought be incurred by a fixed grinding wheel or coarse abrasives contained in the second polishing composition. Also, since the polishing composition comprises water as a medium, it is thought that the frictional resistance between the fixed grinding wheel or the abrasive and the substrate to be polished becomes large, so that the surface roughness of the substrate to be polished cannot be improved by the generated frictional heat or the like. On the other hand, in the case where the chelating compound or a salt thereof is combined with the derivative of the polyhydric alcohol compound, a functional group moiety such as hydroxyl group or hydroxyl groups of the derivative of the polyhydric alcohol compound is adsorbed to the surface of the substrate to be polished, so that an impact of coarse abrasives or the like to the substrate to be polished is eased by the acyl group or hydrocarbon group moiety which is partially esterified or partially etherified, whereby the derivative of the polyhydric alcohol compound reduces the frictional resistance during polishing. Therefore, it is thought that the chelating compound exhibits the above-mentioned functions, so that the generation of the surface defects is suppressed with increasing the polishing rate, whereby the surface roughness can be polished at a fast speed with decreasing the surface roughness from that of the conventional ones.

The content of the derivative of the polyhydric alcohol compound in the first polishing composition is preferably from 0.01 to 20% by weight, more preferably from 0.03 to 15% by weight, still more preferably from 0.05 to 10% by weight, from the viewpoints of reducing the surface roughness of the polished surface and surface defects.

In addition, it is desired that the ratio of the contents of the chelating compound or a salt thereof to the derivative of the polyhydric alcohol compound [content of the chelating compound or a salt thereof (% by weight)/content of the derivative of the polyhydric alcohol compound (% by weight)] is such that these compounds are formulated at a ratio from 0.002 to 2000, preferably from 0.01 to 300, more preferably from 0.05 to 50, from the viewpoints of sufficiently exhibiting the effects of increasing the polishing rate, and reducing the surface roughness and the surface defects. Especially in the case of polishing a substrate for precision parts such as a substrate made of Ni—P plated aluminum alloy, when these compounds are formulated at a ratio of from 0.01 to 100, preferably from 0.03 to 50, more preferably from 0.05 to 30, it is especially preferable because the generation of the surface defects can be suppressed with increasing the polishing rate, so that polishing can be carried out at a fast rate with lowering the surface roughness as compared that of the conventional one.

Water in the polishing composition of this embodiment is used as a medium. It is desired that its content is preferably from 50 to 99.9%, more preferably from 70 to 99.5%, still more preferably from 90 to 99%, from the viewpoint that the object to be polished can be efficiently polished.

The first polishing composition of this embodiment having the composition defined above is effective in the polishing process using a fixed grinding wheel. For instance, by using the first polishing composition of this embodiment during polishing in a polishing process with a fixed grinding wheel, there can be achieved an increase in the polishing rate and reduction in the surface roughness, without causing surface defects such as scratches and pits to the substrate to be polished.

The second polishing composition of this embodiment is a composition further comprising an abrasive to the first polishing composition.

As the abrasive used in the second polishing composition of this embodiment, any abrasive grains generally employed for polishing can be used. Examples of the abrasive grains include metals; carbides of metals or metalloids, nitrides of metals or metalloids, oxides of metals or metalloids, borides of metals or metalloids; diamond, and the like. The metal elements or metalloid elements include those elements belonging to the Groups 2A, 2B, 3A, 3B, 4A, 4B, 5A, 6A, 7A or 8 of the Periodic Table (long period form). Concrete examples of the abrasive grains include alumina particles, silicon carbide particles, diamond particles, magnesium oxide particles, zinc oxide particles, cerium oxide particles, zirconium oxide particles, colloidal silica particles, fumed silica particles, and the like. It is preferable to use one or more kinds of these abrasive grains, from the viewpoint of increasing the polishing rate. Especially, alumina particles, cerium oxide particles, zirconium oxide particles, colloidal silica particles, and fumed silica particles are suitable for polishing semiconductor wafers and semiconductor elements and substrates for precision parts such as substrates for magnetic recording media. Especially, the alumina particles and the colloidal silica particles are suitable for polishing a substrate for magnetic recording medium. The alumina particles include $\alpha$-alumina particles and intermediate alumina particles having a crystal form other than the $\alpha$-alumina particles. Although the $\alpha$-alumina particles are more suitable, from the viewpoint of the polishing rate, the intermediate alumina particles can be also used, for instance, in the case where the surface roughness is desired to be very low. The term "intermediate alumina particles" referred to in the present specification is a generic term referring to alumina particles other than the $\alpha$-alumina particles. Concrete examples thereof include $\gamma$-alumina particles, $\delta$-alumina particles, $\theta$-alumina particles, $\eta$-alumina particles, $\kappa$-alumina particles, mixtures thereof, and the like. As the alumina particles, those alumina-based particles of which secondary particles are re-dispersed in the primary particles during mechanical stirring and polishing of the polishing composition of this embodiment can be preferably used.

The average particle size of the primary particles of the abrasive is preferably from 0.002 to 3 $\mu$m, more preferably from 0.01 to 3 µm, still more preferably from 0.01 to 1 µm, still more preferably from 0.02 to 0.8 µm, especially preferably from 0.05 to 0.5 µm, from the viewpoint of increasing the polishing rate. Especially in the case where the alumina-based particles are used as the abrasive, the average particle size is preferably from 0.01 to 1 µm, more preferably from 0.02 to 0.8 µm, especially preferably from 0.05 to 0.5 µm, from the viewpoint of reducing the surface roughness of the object to be polished. Further, in the case where the primary particles are aggregated to form secondary particles, the average particle size of the secondary particles thereof is preferably from 0.05 to 2 µm, more preferably from 0.1 to 1.5 µm, especially preferably from 0.2 to 1.2 µm, most preferably from 0.3 to 1.2 µm, similarly from the viewpoint of increasing the polishing rate and from the viewpoint of reducing the surface roughness of the object to be polished. The average particle size of the primary particles of the abrasive can be determined by carrying out image analysis by observation with a scanning electron microscope (magnification: preferably from 3000 to 30000 times) to determine an arithmetic means of width and length of a particle. In addition, the average particle size of the secondary particles can be determined as a volume-average particle size by using a laser beam diffraction method.

The Knoop hardness (JIS Z-225 1) of the abrasive is preferably from 700 to 9000, more preferably from 1000 to 5000, still more preferably from 1500 to 3000, from the viewpoint of obtaining a sufficient polishing rate, and from the viewpoint of not generating surface defects of the object to be polished.

The specific gravity of the abrasive is preferably from 2 to 6, more preferably from 2 to 5, still more preferably from 2 to 4, from the viewpoint of dispersibility, feeding ability and collecting and reusability for a polishing device.

In the second polishing composition of this embodiment, especially preferably used abrasives are a-alumina particles having a Knoop hardness of from 1500 to 3000, purity of 98% by weight or more, preferably 99% by weight or more, especially preferably 99.9% by weight or more, from the viewpoint of improving the synergistic effects of the increase in the polishing rate and the prevention of the generation of the surface defects by adding the abrasive, the chelating compound or a salt thereof, and the derivative of the polyhydric alcohol compound. These abrasives can be prepared by crystal growth method (Verneuil method or the like) using a high-purity aluminum salt. Here, the purity of the abrasive can be determined by dissolving 1 to 3 g of an abrasive in an acid or an aqueous alkali, and quantifying aluminum ions in the solution by employing a method for determination of plasma emission analysis.

The abrasive is used in a slurry state in which water is used as a medium. It is preferable that the content of the abrasive in the second polishing composition of this embodiment is properly determined in accordance with the viscosity of the polishing composition, the required qualities for the object to be polished, and the like. It is desired that the content of the abrasive in the second polishing composition of this embodiment is from 0.01 to 40 parts by weight, preferably from 0.1 to 25 parts by weight, more preferably from 1 to 15 parts by. weight, based on 100 parts by weight of the first polishing composition, from the viewpoint of economic advantages, and from the viewpoint of lowering the surface roughness, thereby making it possible to efficiently polish the object.

In addition, it is desired that the ratio of the contents of the abrasive to the chelating compound or a salt thereof and the derivative of the polyhydric alcohol compound in the second polishing composition of this embodiment [content of the abrasive (% by weight)/content of the chelating compound or a salt thereof and the derivative of the polyhydric alcohol compound (% by weight)] is such that these compounds are formulated at a ratio of from 0.001 to 200, preferably from 0.01 to 100, more preferably from 0.1 to 50, especially preferably from 1 to 25, from the viewpoints of sufficiently exhibiting effects of increasing the polishing rate and reducing the surface roughness.

[Embodiment B]

As the abrasive used in this embodiment, any abrasive grains other than the intermediate alumina generally employed for polishing can be used. The abrasive grains may be the same ones as those used in Embodiment A mentioned above. Among them, α-alumina particles, cerium oxide particles, zirconium oxide particles, colloidal silica particles, fined silica particles and the like are suitable for polishing semiconductor wafers and semiconductor elements and substrates for precision parts such as substrates for magnetic recording media. Especially, the α-alumina particles are suitable for polishing a substrate for magnetic recording medium.

In addition, properties such as the average particle size of the primary particles, the average particle size of the secondary particles, the Knoop hardness, and the specific gravity of the abrasive used in this embodiment may be the same as those in Embodiment A mentioned above.

The content of the abrasive is preferably from 1 to 40% by weight, more preferably from 2 to 30% by weight, still more preferably from 3 to 15% by weight, of the polishing composition, from the viewpoints of economic advantages and lowering the surface roughness, thereby making it possible to carry out polishing efficiently.

The intermediate alumina particles used in this embodiment may be the same ones as those used in Embodiment A mentioned above. Among them, the following intermediate aluminas are preferable, from the viewpoints of the effects of increase in the polishing rate and reduction in the surface roughness. Their crystal forms are preferably γ-alumina, δ-alumina, θ-alumina, mixtures thereof, and the like, more preferably γ-alumina, δ-alumina, mixtures thereof, especially preferably γ-alumina. In addition, their specific surface area is preferably from 30 to 300 m$^2$/g, more preferably from 50 to 200 m$^2$/g. Their average particle size is preferably from 0.01 to 5 µm, more preferably from 0.05 to 5 µm, still more preferably from 0.1 to 3 µm, especially preferably from 0.1 to 1.5 µm. This average particle size can be determined as a volume-average particle size by using a laser beam diffraction method. In addition, the content of the alkali metal and the alkaline earth metal in the intermediate alumina particles is preferably 0.1% by weight or less, more preferably 0.05% by weight or less, especially preferably 0.01% by weight or less.

For instance, in a case where aluminum hydroxide, which has a relatively large specific surface area and a low content of the alkali metal and the alkaline earth metal, is used as a raw material, the fusion of the prepared intermediate alumina is small and the particle strength is small, so that there are no surface defects in the substrate to be polished, and thereby are especially effective for reducing the surface roughness.

The aluminum hydroxide used as a raw material for this purpose has a specific surface area of preferably 10 m$^2$/g or more, more preferably 30 m$^2$/g or more, especially preferably 50 m$^2$/g or more. In addition, the aluminum hydroxide has a content of each of the alkali metal and the alkaline earth metal of preferably 0.1% by weight or less, more preferably 0.05% by weight or less, especially preferably 0.01% by weight or less. Furthermore, in the case where an intermediate alumina is prepared by subjecting aluminum hydroxide to thermal dehydration, forcible introduction of dry air or nitrogen gas during calcination is further effective in the reduction of the surface defects and the surface roughness of the substrate to be polished. Here, the above-mentioned thermal dehydration treatment can be carried out by an ordinary process.

These intermediate aluminas are adjusted to a given particle size by wet pulverization or dry pulverization by using a pulverizer such as a ball-mill, a beads-mill, a high-pressure homogenizer or a jet mill as occasion demands.

The aluminum hydroxide is represented by the formula $Al(OH)_3$, $AlOOH$, $AlOOH.nH_2O$, or $Al_2O_3.nH_2O$, and is not particularly limited, as long as the aluminum hydroxide can prepare an intermediate alumina by thermal dehydration. Concrete examples thereof include gibbsite, bayerite, nordstrandite, diaspore, boehmite, pseudo-boehmite, alumino-gel, and the like.

Although the details of the function mechanism during the polishing of this intermediate alumina are unknown, the intermediate alumina has an accelerated effect of polishing and an effect of reducing the surface roughness, and also further improves the accelerated effect of polishing together with preventing surface defects such as pits, which are thought to be caused by a strong chemical action of the chelating compound to the polished surface, whereby the surface roughness can be reduced.

Especially, the intermediate alumina particles used in this embodiment are formulated as an additive in the polishing composition. By using the intermediate alumina particles together with the α-alumina particles used as the above-mentioned abrasive, there are exhibited excellent effects such as the accelerated polishing and the reduction in the surface roughness.

The content of the intermediate alumina in the polishing composition is from 1 to 50 parts by weight, preferably from 2 to 40 parts by weight, more preferably from 4 to 30 parts by weight, based on 100 parts by weight of the abrasive, from the viewpoints of obtaining economic advantages and the accelerated effect of polishing, the effect of reducing the surface roughness, and the ability for preventing surface defects such as pits.

The lower limit of the content is 1 parts by weight or more, from the viewpoints of the accelerated effect of polishing, the effect of reducing the surface roughness, and the ability for preventing surface defects such as pits, and its upper limit is 50 parts by weight or less, from the viewpoint of the accelerated effect of polishing.

The chelating compound may be the same ones as those used in Embodiment A mentioned above.

The content of the chelating compound or a salt thereof is preferably from 0.05 to 20% by weight, more preferably from 0.1 to 15% by weight, still more preferably from 0.5 to 10% by weight, of the polishing composition, from the viewpoint of increasing the polishing rate. In addition, the content of the chelating compound or a salt thereof is preferably from 10 to 1000 parts by weight, more preferably from 20 to 300 parts by weight, especially preferably from 30 to 100 parts by weight, based on 100 parts by weight of the intermediate alumina formulated simultaneously therewith, from the viewpoints of obtaining the effect of reducing the surface roughness and the ability for preventing surface defects such as pits.

Water in the polishing composition of this embodiment is used as a medium, and the content thereof is preferably from 40 to 98% by weight, more preferably from 50 to 97% by weight, especially preferably from 60 to 95% by weight, from the viewpoint of being capable of efficiently polishing the object to be polished.

[Embodiment C]

Each of the abrasive, the chelating compound or a salt thereof, and the intermediate alumina may be the same ones as those used in Embodiment B mentioned above. The content of the abrasive in the fourth polishing composition is preferably from 1 to 40% by weight, more preferably from 2 to 30% by weight, still more preferably from 3 to 15% by weight. The content of the chelating compound or a salt thereof in the fourth polishing composition is preferably from 0.05 to 20% by weight, more preferably from 0.1 to 15% by weight, still more preferably from 0.5 to 10% by weight.

In addition, the content of the intermediate alumina in the fourth polishing composition is from 1 to 50 parts by weight, preferably from 2 to 40 parts by weight, more preferably from 4 to 30 parts by weight, based on 100 parts by weight of the abrasive, from the viewpoints of obtaining economic advantages and the accelerated effect of polishing, the effect of reducing the surface roughness, and the ability for preventing surface defects such as pits.

The partially esterified product and/or partially etherified product of a polyhydric alcohol compound used in this embodiment may be the same ones as those in Embodiment A mentioned above. Among them, the derivatives of the cyclic polyhydric alcohol compounds are preferable, from the viewpoint of the reduction in the surface roughness, and the partially esterified products of sucrose are especially preferable.

The content of the partially esterified product and/or partially etherified product of a polyhydric alcohol compound in the fourth polishing composition is preferably from 0.01 to 20% by weight, more preferably from 0.03 to 15% by weight, still more preferably from 0.05 to 10% by weight.

Water in the fourth polishing composition of this embodiment is used as a medium. Its content is preferably from 10 to 99% by weight, more preferably from 30 to 97% by weight, especially preferably from 60 to 95% by weight, from the viewpoint that the object to be polished can be efficiently polished.

The polishing compositions (the first to fourth polishing compositions) of the present invention shown in Embodiments A to C described above can be formulated with other components as occasion demands. Other components are metal salts and ammonium salts of monomeric acid compounds; peroxides; thickening agents; dispersants; anticorrosive agents; basic substances; surfactants; and the like. Concrete examples of the metal salts and ammonium salts of monomeric acid compounds; peroxides; thickening agents; and dispersants include those listed in Japanese Patent Laid-Open No. Sho 62-25187, page 2, upper right column, line 3 to upper right column, line 11; Japanese Patent Laid-Open No. Sho 63-251163, page 2, upper left column, line 6 to page 3, upper left column, line 8; Japanese Patent Laid-Open No. Hei 1-205973, page 2, upper left column, line 5 to page 3, upper right column, line 2; Japanese Patent Laid-Open No. Hei 4-275387, page 2, left column, line 27 to page 3, left column, line 12; Japanese Patent Laid-Open No. Hei 5-59351, page 2, right column, line 23 to page 3, left column, line 37; Japanese Patent Laid-Open No. Hei 2-158683, page 2, lower left column, line 15 to lower right column, line 10; and Japanese Patent Laid-Open No. Hei 7-216345, page 3, left column, line 4 to left column, line 25.

It is preferable that the content of each of these components in the polishing composition of the present invention is from 0.1 to 10% by weight or so.

It is preferable that the pH of the polishing composition of the present invention is properly determined depending upon the kinds of the object to be polished and the required qualities. For instance, the pH of the polishing composition of the present invention is preferably from 2 to 12, from the viewpoints of cleanability of the substrate to be polished and preventiveness of the corrosion of working machines. In addition, in the case where the object to be polished is a substrate for precision parts mainly made of a metal, such as an aluminum substrate produced by Ni—P plating, the pH of the polishing composition is more preferably from 2 to 8, especially preferably from 3 to 7, from the viewpoints of increase in the polishing rate and improvement in the surface qualities. Further, in a case where the polishing composition of the present invention is used for polishing semiconductor wafers and semiconductor elements, especially for polishing silicon wafers, the pH of the polishing composition is preferably from 7 to 12, more preferably from 8 to 12, especially preferably from 9 to 11, from the viewpoints of increasing the polishing rate and improving the surface quality. The pH can be adjusted by properly adding an inorganic acid such as nitric acid or sulfuric acid, a metal salt or ammonium salt of a monomeric acid compound mentioned above, a peroxide mentioned above, or a basic substance such as potassium hydroxide, sodium hydroxide, ammonia, an alkylammonium, or an amine, in a desired amount.

The polishing process of a substrate to be polished of the present invention comprises polishing a substrate to be polished by using the polishing composition of the present invention, or preparing a polishing liquid by mixing each component so as to give the composition of the polishing composition of the present invention. Especially when the second, third or fourth polishing composition of the present invention is used, the substrate for precision parts can be favorably produced.

In addition, the process for producing a substrate to be polished of the present invention comprises the step of polishing a substrate to be polished by using the polishing composition of the present invention.

The material for the object to be polished as represented by a substrate to be polished includes, for instance, metals or metalloids such as silicon, aluminum, nickel, tungsten and copper; alloys made of these metals as the main components; glassy substances such as glass, glassy carbon and amorphous carbons; ceramic materials such as alumina, titanium carbide and silicon dioxide; resins such as polyimide resins; and the like. Among them, metals such as aluminum, nickel, tungsten and copper, alloys made of these metals as the main components, or semiconductor substrates of semiconductor elements containing these metals are preferable. Especially when the polishing composition of the present invention is used during the polishing of a substrate to be polished made of an Ni—P plated aluminum alloy, it is preferable, because the generation of surface defects such as scratches and pits is suppressed, so that the polishing can be carried out a fast rate with reducing the surface roughness as compared to that of the prior art.

The shapes for the objects to be polished are not particularly limited. For instance, those having shapes containing planar portions such as those in the forms of disks, plates, slabs and prisms, or shapes containing curved portions such as lenses can be subjects for polishing with the polishing composition of the present invention. Among them, the disc-shaped objects to be polished are especially excellent in polishing.

The first polishing composition of the present invention can be favorably used especially in high-precision polishing for planar surfaces, curved surfaces, cylindrical internal surfaces of the substrate for precision parts, and the like. For instance, the first polishing composition is suitable for high-precision polishing requiring planar surfaces and curved surfaces such as optical lenses, optical mirrors, half mirrors and optical prisms.

The second, third or fourth polishing composition of the present invention can be favorably used especially in polishing the substrate for precision parts. For instance, the polishing composition is suitable for polishing substrates for magnetic recording media such as hard disks, optical disks, opto-magnetic disks, and the like; semiconductive substrates such as semiconductive wafers and semiconductive elements; optical lenses, optical mirrors, half mirrors and optical prisms; and the like. Among them, the polishing composition is suitable for polishing the substrates for magnetic recording media and the semiconductive substrates, especially for polishing the hard disk substrates. The polishing of the semiconductive elements is carried out in, for instance, the step of flattening an interlayer insulating film, the step of forming an embedded metal line, the step of forming separation membrane for an embedded element, the step of forming an embedded capacitor, and the like.

By polishing the substrate to be polished in the manner described above, a substrate for precision parts or the like can be produced.

The polishing composition of the present invention especially has an effect in the polishing process, and the polishing composition can be similarly applied to the other polishing process, for instance, a lapping process or the like.

EXAMPLES

Examples I-1 to I-23 and Comparative Examples I-1 to I-10

A chelating compound or a salt thereof as listed in Table 1, a derivative of polyhydric alcohol compound as listed in Table 2, and ion-exchanged water were mixed and stirred, to give a first polishing composition having a composition as shown in Table 3 or 4.

TABLE 1

| Kind | Chelating Compound or Salt Thereof |
| --- | --- |
| a | Sodium Ethylenediaminetetraacetate |
| b | Aluminum Ammonium Ethylenediaminetetraacetate |
| c | Sodium Ferric Ethylenediaminetetraacetate |
| d | Sodium Cobalt (III) Ethylenediaminetetraacetate |
| e | Malic Acid:Ferric Nitrate = 1:0.5 (weight ratio) |
| f | Cobalt (III) Tartrate |
| g | Tartaric Acid |

TABLE 2

| Kind | Derivative of Polyhydric Alcohol Compound | Esterification Ratio or Etherification Ratio (%) |
| --- | --- | --- |
| h | Ester of Sucrose and Lauric Acid | 34.0 |
| i | Ester of Sucrose and Lauric Acid | 16.0 |
| j | Ester of Sucrose and Palmitic Acid | 17.0 |
| k | Ester of Sucrose and Myristic Acid | 15.0 |
| l | Ester of Sucrose and Stearic Acid | 19.0 |
| m | Ester of Sucrose and Oleic Acid | 18.0 |
| n | Ester of Polyglycerol and Lauric Acid | 21.5 |
| o | Ester of Polyglycerol and Stearic Acid | 18.5 |

TABLE 2-continued

| Kind | Derivative of Polyhydric Alcohol Compound | Esterification Ratio or Etherification Ratio (%) |
|---|---|---|
| p | Tetraoleate of Adduct of Sorbitol with 30 Moles of Ethylene Oxide | 21.2 |
| q | Tetraoleate of Adduct of Sorbitol with 60 Moles of Ethylene Oxide | 14.2 |
| r | n-C$_7$H$_{15}$COO(CH$_2$CH$_2$O)$_6$CH$_2$CH(OH)CH$_2$OH | 36.2 |
| s | n-C$_{17}$H$_{33}$COO(CH$_2$CH$_2$O)$_6$CH$_2$CH(OH)CH$_2$OH | 29.0 |
| t | n-C$_4$H$_9$OCH$_2$CH(OH)CH$_2$OH | 37.0 |
| u | n-C$_8$H$_{17}$OCH$_2$CH(OH)CH$_2$OH | 35.0 |
| v | Adduct of Oleyl alcohol with 30 Moles of ethylene oxide | — |
| w | Adduct of Nonylphenol with 11 Moles of ethylene oxide | — |

Ten parts by weight of α-alumina (purity: about 99.9%) having a Knoop hardness of 2000, a primary average particle size of 0.29 μm and a secondary average particle size of 0.75 μm were added, based on 100 parts by weight of each of these first polishing compositions, and the mixture was mixed and stirred, to give each of second polishing compositions.

Using each of the resulting second polishing compositions, a substrate surface made of an Ni—P plated aluminum alloy, the substrate surface having an average surface roughness Ra of 0.1 μm as determined by the following method, a thickness of 0.9 mm and a diameter of 2.5 inches, was polished with a double-sided processing machine under the set conditions for double-sided processing machine given below, to give a polished object which is an Ni—P plated, aluminum alloy substrate usable as a substrate for magnetic recording media.

The set conditions for double-sided processing machine are shown below.

Double-sided processing machine used: double-sided processing machine,
Model 6B, manufactured by Kyoritsu Seiki K.K.
Processing pressure: 9.8 kPa
Polishing Pad: POLYTEX DG (manufactured by Rodel Nitta K.K.).
Disc rotational speed: 40 r/min
Feeding flow rate for a polishing composition: 30 mL/min
Polishing time period: 7 minutes The thickness of an aluminum alloy substrate after polishing was measured. A rate of decrease in the thickness was determined from the changes in the thickness of the aluminum alloy substrate before and after polishing, and a relative value (relative rate) was determined on the basis of that of Comparative Example I-1.

In addition, average surface roughness Ra and surface defects (scratches) of each of the substrate surfaces after polishing were determined by the following methods. Incidentally, the relative value of average surface roughness Ra (relative roughness) was determined on the basis of that of Comparative Example I-1. The results are shown in Table 3.

[Average Surface Roughness Ra (Relative Roughness)]

The average surface roughness was determined under the following conditions by using Talystep commercially available from Rank Taylor-Hobson Limited.

Size of tip end of profilometer: 25 μm×25 μm
By-pass filter: 80 μm
Measurement length: 0.64 mm

[Surface Defects (Scratches)]

Each of the substrate surfaces was observed with an optical microscope (differential interference microscope) with a magnification of 50 times at 6 locations at 60-degree intervals. The depth of the scratches was determined by Zygo (commercially available from Zygo). The evaluation criteria are as follows.

-Evaluation Criteria-

S: Scratches with a depth exceeding 50 nm are zero (0)/field.
A: Scratches with a depth exceeding 50 nm are less than 0.5/field on average.
B: Scratches with a depth exceeding 50 nm are 0.5 or more and less than 1/field on average.
C: Scratches with a depth exceeding 50 nm is 1 or more/field on average.

TABLE 3

| | Composition of First Polishing Composition (% by Weight) | | | | | Evaluation of Properties | | |
|---|---|---|---|---|---|---|---|---|
| | Chelating Compound or Salt Thereof | | Derivative of Polyhydric Alcohol Compound | | Water | Relative | Relative | |
| | Kind | % by Weight | Kind | % by Weight | % by Weight | Rate | Roughness | Scratches |
| Ex. I-1 | a | 1.0 | h | 0.3 | 98.7 | 1.2 | 0.6 | A |
| Ex. I-2 | b | 1.0 | h | 0.1 | 98.9 | 2.5 | 0.69 | S |
| Ex. I-3 | b | 1.0 | h | 0.3 | 98.7 | 2.0 | 0.6 | S |
| Ex. I-4 | b | 1.0 | h | 0.5 | 98.5 | 1.7 | 0.55 | S |
| Ex. I-5 | b | 1.0 | i | 0.3 | 98.5 | 1.5 | 0.62 | S |
| Ex. I-6 | b | 1.0 | j | 0.3 | 98.7 | 1.6 | 0.63 | S |
| Ex. I-7 | b | 1.0 | k | 0.3 | 98.7 | 1.5 | 0.62 | S |
| Ex. I-8 | b | 1.0 | l | 0.3 | 98.7 | 1.4 | 0.59 | S |
| Ex. I-9 | b | 1.0 | m | 0.3 | 98.7 | 1.5 | 0.58 | S |
| Ex. I-10 | b | 1.0 | n | 0.3 | 98.7 | 1.6 | 0.68 | S |
| Ex. I-11 | b | 1.0 | o | 0.3 | 98.7 | 1.4 | 0.66 | S |
| Ex. I-12 | b | 1.0 | p | 0.3 | 98.7 | 1.4 | 0.65 | S |
| Ex. I-13 | b | 1.0 | q | 0.3 | 98.7 | 1.3 | 0.68 | S |
| Ex. I-14 | b | 1.0 | r | 0.3 | 98.7 | 1.4 | 0.7 | S |
| Ex. I-15 | b | 1.0 | s | 0.3 | 98.7 | 1.4 | 0.65 | S |
| Ex. I-16 | b | 1.0 | t | 0.3 | 98.7 | 1.5 | 0.69 | S |

TABLE 3-continued

| | Composition of First Polishing Composition (% by Weight) | | | | | | Evaluation of Properties | | |
|---|---|---|---|---|---|---|---|---|---|
| | Chelating Compound or Salt Thereof | | Derivative of Polyhydric Alcohol Compound | | Water | Relative Rate | Relative Roughness | Scratches |
| | Kind | % by Weight | Kind | % by Weight | % by Weight | | | |
| Ex. I-17 | b | 1.0 | u | 0.3 | 98.7 | 1.4 | 0.62 | S |
| Ex. I-18 | c | 1.0 | h | 0.2 | 98.8 | 1.5 | 0.63 | A |
| Ex. I-19 | d | 1.0 | h | 0.2 | 98.8 | 1.6 | 0.65 | A |
| Ex. I-20 | e | 1.5 | i | 0.2 | 98.3 | 1.4 | 0.61 | A |
| Ex. I-21 | f | 1.0 | i | 0.2 | 98.8 | 1.4 | 0.64 | A |
| Ex. I-22 | a | 0.3 | b | 0.2 | 98.3 | 1.9 | 0.69 | S |
| | h | 1.2 | | | | | | |
| Ex. I-23 | b | 1.0 | h | 0.2 | 98.3 | 2.0 | 0.72 | A |
| | g | 0.5 | | | | | | |

TABLE 4

| | Composition of First Polishing Composition (% by Weight) | | | | | | Evaluation of Properties | | |
|---|---|---|---|---|---|---|---|---|---|
| | Chelating Compound or Salt Thereof | | Derivative of Polyhydric Alcohol Compound | | Water | Relative Rate | Relative Roughness | Scratches |
| | Kind | % by Weight | Kind | % by Weight | % by Weight | | | |
| Comp. Ex. I-1 | — | — | — | — | 100.0 | 1.0 | 1.0 | C |
| Comp. Ex. I-2 | b | 1.0 | — | — | 99.0 | 2.7 | 1.3 | B |
| Comp. Ex. I-3 | c | 1.0 | — | — | 99.0 | 1.9 | 0.89 | B |
| Comp. Ex. I-4 | e | 1.5 | — | — | 98.5 | 2.1 | 0.95 | B |
| Comp. Ex. I-5 | — | — | h | 0.5 | 99.5 | 0.9 | 0.55 | S |
| Comp. Ex. I-6 | — | — | n | 0.3 | 99.7 | 0.85 | 0.60 | A |
| Comp. Ex. I-7 | — | — | s | 0.3 | 99.7 | 0.88 | 0.62 | A |
| Comp. Ex. I-8 | — | — | u | 0.3 | 99.7 | 0.81 | 0.59 | B |
| Comp. Ex. I-9 | b | 1.0 | v | 0.3 | 98.7 | 1.6 | 1.2 | B |
| Comp. Ex. I-10 | b | 1.0 | w | 0.3 | 98.7 | 1.5 | 1.15 | B |

It is seen from the results shown in Tables 3 and 4 that when the second polishing composition obtained each of in Examples I-1 to I-23 was used, the polishing rate is high, so that there can be obtained a substrate to be polished which has a smaller surface roughness, less scratches and more excellent polished surface, as compared to the case where each of those obtained in Comparative Examples I-1 to I-10 was used.

Also, in the second polishing composition, when only the chelating compound or a salt thereof shown in each of Comparative Examples I-2 to I-4 was used, the effects of improving the surface roughness (relative roughness) and the surface defects are insufficient, even though the polishing rate (relative rate) is increased. In addition, when only the derivative of the polyhydric alcohol compound shown in each of Comparative Examples I-5 to I-8 was used, although there are some effects of improving the surface roughness (relative roughness) and the surface defects, there is no improvement in the polishing rate (relative rate). When the above chelating compound or a salt thereof and the derivative of the polyhydric alcohol compound are used together, as shown in each of Examples I-1 to I-23, both properties of the polishing rate (relative rate) and the surface roughness (relative roughness) and the surface defects can be improved.

<Preparation Example 1 for Intermediate Alumina>

An alumina vessel (200 mm in length×100 mm in width× 100 mm in height) was charged with 200 g of pseudo-boehmite particles having an average particle size of 20 μm, a specific surface area of 250 m²/g, an alkali metal content of 0.005% by weight, and an alkaline earth metal content of 0.001% by weight. The pseudo-boehmite particles were baked in a muffle furnace at a baking rate of 5° C./minute, and a baking temperature of 600° C. for 4 hours with nitrogen gas stream at a flow rate of 5 L/minute, to give 140 g of an intermediate alumina. The intermediate alumina was transferred to a 2-L alumina ball-mill, and 327 g of ion-exchanged water was added thereto to prepare a 30% by weight slurry. Thereafter, 1000 g of alumina balls of 5 mm in diameters were introduced into the ball-mill to disrupt the slurry, and the disrupted slurry was then sieved to remove the alumina balls, to prepare 130 g of intermediate alumina particles. The prepared intermediate alumina particles were found to be γ-alumina having an average particle size of 0.7 μm, a specific surface area of 130 m²/g, an alkali metal content of 0.0055% by weight, and an alkaline earth metal content of 0.0013% by weight.

<Preparation Example 2 for Intermediate Alumina>

An alumina vessel (200 mm in length×100 mm in width× 100 mm in height) was charged with 200 g of aluminum hydroxide having an average particle size of 10 μm, a specific surface area of 7 m²/g, and an alkali metal content of 0.2% by weight. The aluminum hydroxide was baked in a muffle furnace at a baking rate of 100° C./minute, and a baking temperature of 700° C. for 4 hours, to give 140 g of an intermediate alumina. This intermediate alumina was subjected to treatments in the same manner as in Preparation Example 1, to prepare 130 g of intermediate alumina particles. The prepared alumina particles were found to be η-alumina having an average particle size of 0.6 μm, a specific surface area of 110 m²/g, and an alkali metal content of 0.2% by weight.

Examples II-1 to II-6 and Comparative Examples II-1 to II-5

An abrasive (α-alumina having a primary average particle size of 0.25 μm, and a secondary average particle size of 0.7 μm (purity: about 99.9%), specific gravity: 4.0), an intermediate alumina, a salt of a chelating compound, a pH adjusting agent (an aqueous ammonia or methanesulfonic acid), and ion-exchanged water were mixed and stirred, to prepare a polishing composition having the composition as shown in Table 5.

After polishing, the thickness of an aluminum alloy substrate was determined, and a rate of decrease in the thickness was determined from the changes in the thickness of the aluminum alloy substrate before and after polishing. A relative value (relative rate) was determined on the basis of that of Comparative Example II-1. The results are shown in Table 6.

In addition, average surface roughness Ra and scratches of each of the substrate surfaces after polishing were determined in the same manner as above, and pits were determined in accordance with the following methods. Incidentally, in Examples II-1 to II-6 and Comparative Examples II-2 to II-5, the relative value (relative roughness) was determined on the basis of that of Comparative Example II-1. The results are shown in Table 6.

TABLE 5

| | α-Alumina Content (parts by weight) | Intermediate Alumina | Content (parts by weight) | Chelating Compound or Salt Thereof | Content (parts by weight) | Ion-Exchanged Water and pH Adjusting Agent (parts by weight) | pH |
|---|---|---|---|---|---|---|---|
| Ex. II-1 | 8 | Prep. Ex. 1 | 0.3 | Aluminum Ammonium Ethylenediaminetetraacetate | 0.5 | 91.2 | 4.5 |
| Ex. II-2 | 8 | Prep. Ex. 1 | 1.5 | Aluminum Ammonium Ethylenediaminetetraacetate | 1 | 89.5 | 4.5 |
| Ex. II-3 | 8 | Prep. Ex. 1 | 1.5 | Ferric Ethylenediaminetetraacetate | 1 | 89.5 | 6.5 |
| Ex. II-4 | 8 | Prep. Ex. 1 | 1.5 | Malic Acid:Ferric Nitrate 1:0.5 (weight ratio) | 1 | 89.5 | 3.5 |
| Ex. II-5 | 8 | Prep. Ex. 2 | 0.5 | Aluminum Ammonium Ethylenediaminetetraacetate | 1 | 90.5 | 4.5 |
| Ex. II-6 | 8 | Prep. Ex. 1 | 3.0 | Aluminum Ammonium Ethylenediaminetetraacetate | 1 | 88 | 4.5 |
| Comp. Ex. II-1 | 8 | None | — | None | — | 92 | 7.0 |
| Comp. Ex. II-2 | 8 | Prep. Ex. 1 | 1 | None | — | 91 | 4.5 |
| Comp. Ex. II-3 | 8 | None | — | Aluminum Ammonium Ethylenediaminetetraacetate | 1 | 91 | 4.5 |
| Comp. Ex. II-4 | 8 | Prep. Ex. 1 | 5 | Aluminum Ammonium Ethylenediaminetetraacetate | 0.5 | 86.5 | 4.5 |
| Comp. Ex. II-5 | 8 | Boehmite* | 3 | Disodium Ethylenediaminetetraacetate | 1 | 88 | 5.5 |

*Boehmite: Manufactured by Nissan Chemical Industries, Ltd., "Alumina Sol-520."

Using each of the resulting polishing compositions, a substrate surface made of an Ni—P plated aluminum alloy, the substrate surface having an average surface roughness Ra of 0.1 μm, as determined by the following method, a thickness of 0.8 mm and a diameter of 3.5 inches was polished with a double-sided processing machine under the set conditions for double-sided processing machine given below, to give a polished object, which is an Ni—P plated, aluminum alloy substrate usable as a substrate for magnetic recording media.

The set conditions for double-sided processing machine are shown below.

Double-sided processing machine used: double-sided processing machine,
Model 9B, manufactured by SPEEDFAM CO., LTD.
Processing pressure: 9.8 kPa
Polishing Pad: POLYTEX DG (manufactured by Rodel Nitta K.K.).
Disc rotational speed: 50 r/min
Feeding flow rate for a polishing composition: 100 mL/min
Polishing time period: 5 minutes
Number of substrate introduced: 10

[Surface Defects (Pits)]

Each of the substrate surface was observed with an optical microscope (differential interference microscope) at a magnification of 200 times at an interval of 30° for 12 locations, and the number of pits for the 12 fields was counted. The evaluation criteria are as follows.

(Evaluation Criteria)

| | |
|---|---|
| S: | 0 |
| A: | 1 to 3 |
| B: | 4 to 10 |
| C: | 10 or more |

TABLE 6

| | Evaluation of Properties | | | |
|---|---|---|---|---|
| | Relative Rate | Relative Roughness | Surface Defects (Scratches) | Surface Defects (Pits) |
| Ex. II-1 | 2.1 | 0.70 | S | S |
| Ex. II-2 | 2.6 | 0.72 | S | S |

TABLE 6-continued

Evaluation of Properties

|  | Relative Rate | Relative Roughness | Surface Defects (Scratches) | Surface Defects (Pits) |
|---|---|---|---|---|
| Ex. II-3 | 2.3 | 0.68 | S | S |
| Ex. II-4 | 2.1 | 0.95 | S | S |
| Ex. II-5 | 2.2 | 0.95 | A | A |
| Ex. II-6 | 2.4 | 0.87 | S | S |
| Comp. Ex. II-1 | 1 | 1 | C | B |
| Comp. Ex. II-2 | 1.3 | 0.96 | B | S |
| Comp. Ex. II-3 | 2.1 | 2.3 | C | B |
| Comp. Ex. II-4 | 1.5 | 1.2 | A | S |
| Comp. Ex. II-5 | 1.5 | 1.4 | A | B |

It is seen from the results in Table 6 that any of the polishing compositions obtained in Examples II-1 to II-6 has a higher polishing rate, and provides a substrate to be polished with a reduced surface roughness and with reduced surface defects such as scratches and pits, as compared to each of the polishing compositions obtained in Comparative Examples II-1 to II-5.

Also, it is seen from the results of Examples II-1 to II-6 and Comparative Example II-4 that each of the polishing compositions (Examples II-1 to II-6) in which the content of the intermediate alumina in the polishing composition is from 1 to 50 parts by weight, based on 100 parts by weight of the abrasive has a higher polishing rate, and provides a substrate to be polished with a reduced surface roughness, as compared to the polishing composition (Comparative Example II-4) in which the content of the intermediate alumina exceeds 50 parts by weight.

Example III-1

A polishing composition was prepared in the same manner as in Example I-1 except for adding 0.2 parts by weight of h shown in Table 2 in place of water, ion-exchanged water and a pH adjusting agent, so that the resulting polishing composition had a pH of 4.5, and the evaluation of the properties of the polishing composition was carried out. The properties of the polishing composition were evaluated. As the property evaluations obtained, the relative rate was 1.9, the relative roughness was 0.60, the surface defects (scratches) were evaluated as S, and surface defects (pits) were evaluated as S.

INDUSTRIAL APPLICABILITY

According to the present invention, a polishing composition capable of increasing the polishing rate and reducing the surface roughness can be obtained, without causing surface defects on the surface of an object to be polished.

In addition, when the polishing composition of the present invention is used, there are exhibited such effects that the polishing rate is increased, and that the surface roughness can be reduced, without causing defects such as scratches and pits on the surface of the object to be polished.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A polishing composition consisting essentially of a chelating compound or a salt thereof; one or more derivatives of a polyhydric alcohol compound selected from the group consisting of a partially esterified product of a polyhydric alcohol compound and a partially etherified product of a polyhydric alcohol compound; and water, wherein an esterification ratio or etherification ratio of the derivatives of the polyhydric alcohol compound is from 10 to 50%.

2. The polishing composition according to claim 1, wherein the chelating compound is an aminocarboxylic acid.

3. The polishing composition according to claim 1 or 2, wherein said derivatives of a polyhydric alcohol compound are partially esterified products of sucrose.

4. A polishing composition comprising a chelating compound or a salt thereof; a partially etherified product of a polyhydric alcohol compound; an abrasive and water, wherein an etherification ratio of the partially etherified product is from 10 to 50%.

5. A polishing composition comprising water, an abrasive, an intermediate alumina, and a chelating compound or a salt thereof, wherein the content of the intermediate alumina is from 1 to 50 parts by weight, based on 100 parts by weight of the abrasive.

6. The polishing composition according to claim 5, wherein the intermediate alumina has a specific surface area of from 30 to 300 m$^2$/g and an average particle size of from 0.01 to 5 μm.

7. The polishing composition according to claim 5 or 6, wherein the intermediate alumina is prepared from aluminum hydroxide having a specific surface area of 10 m$^2$/g or more and contents of an alkali metal and an alkaline earth metal of 0.1% by weight or less.

8. The polishing composition according to claim 5 or 6, wherein the chelating compound is an aminocarboxylic acid.

9. A polishing composition comprising water, an abrasive, an intermediate alumina, a chelating compound or a salt thereof, and one or more derivatives of a polyhydric alcohol compound selected from the group consisting of a partially esterified product of a polyhydric alcohol compound and a partially etherified product of a polyhydric alcohol compound, wherein the content of the intermediate alumina is from 1 to 50 parts by weight, based on 100 parts by weight of the abrasive, and wherein an esterification ratio or etherification ratio of the derivatives of the polyhydric alcohol compound is from 10 to 50%.

10. The polishing composition according to claim 9, wherein the chelating compound is an aminocarboxylic acid.

11. The polishing composition according to claim 9 or 10, wherein said derivatives of a polyhydric alcohol compound are partially esterified products of sucrose.

12. The polishing composition according to claim 9 or 10, wherein the intermediate alumina has a specific surface area of from 30 to 300 m$^2$/g and an average particle size of from 0.01 to 5 μm.

13. The polishing composition according to claim 9 or 10, wherein the intermediate alumina is prepared from aluminum hydroxide having a specific surface area of 10 m$^2$/g or more and contents of an alkali metal and an alkaline earth metal of 0.1% by weight or less.

14. A polishing process for a substrate to be polished, comprising polishing the substrate to be polished by using a polishing composition having a composition as defined in claim 1 or 2 during polishing.

15. The polishing composition according to claim 1, wherein the content of the derivatives of a polyhydric alcohol compound is 0.01 to 20% by weight.

16. The polishing composition according to claim 5, wherein the intermediate alumina is selected from the group consisting of γ-alumina, δ-alumina, θ-alumina, η-alumina, κ-alumina and mixtures thereof.

17. The polishing composition according to claim 9, wherein the content of the derivatives of a polyhydric alcohol compound is 0.01 to 20% by weight.

18. The polishing composition according to claim 9, wherein the intermediate alumina is selected from the group consisting of γ-alumina, δ-alumina, θ-alumina, η-alumina, κ-alumina and mixtures thereof.

* * * * *